United States Patent
Hosoda et al.

[11] Patent Number: 5,915,767
[45] Date of Patent: *Jun. 29, 1999

[54] BUMPER SIDE SUPPORTING STRUCTURE

[75] Inventors: Hiroyuki Hosoda; Kengo Miyawaki, both of Hamamatsu, Japan

[73] Assignee: Suzuki Motor Corporation, Hamamatsu, Japan

[*] Notice: This patent is subject to a terminal disclaimer.

[21] Appl. No.: 08/482,781

[22] Filed: Jun. 7, 1995

[30] Foreign Application Priority Data

Aug. 26, 1994 [JP] Japan ................................ 6-201776

[51] Int. Cl.⁶ ........................................... B60R 19/24
[52] U.S. Cl. ......................... 293/126; 293/154; 280/848
[58] Field of Search .................................. 293/102, 126, 293/154, 155; 280/847, 848

[56] References Cited

U.S. PATENT DOCUMENTS

| | | | |
|---|---|---|---|
| 4,299,418 | 11/1981 | Dossin | 293/126 |
| 4,447,067 | 5/1984 | Yamashita | 280/848 |
| 4,838,593 | 6/1989 | Fleming et al. | 293/126 |
| 4,875,728 | 10/1989 | Copp et al. | 293/142 X |

FOREIGN PATENT DOCUMENTS

| | | | |
|---|---|---|---|
| 209442 | 12/1982 | Japan | 293/154 |
| 625509 | 6/1949 | United Kingdom | 293/126 |

*Primary Examiner*—Dennis H. Pedder
*Attorney, Agent, or Firm*—Timothy N. Trop

[57] ABSTRACT

In a bumper side supporting structure of the present invention, an outer panel of a wheel house is extended toward the outside of a body beyond an outer panel of a side body, and a bumper side is fastened to the extended portion via a supporting bracket.

2 Claims, 7 Drawing Sheets

BUMPER SIDE SUPPORTING STRUCTURE

FIELD OF THE INVENTION AND RELATED ART STATEMENT

The present invention relates to a bumper side supporting structure on a motor vehicle.

Figure 9:
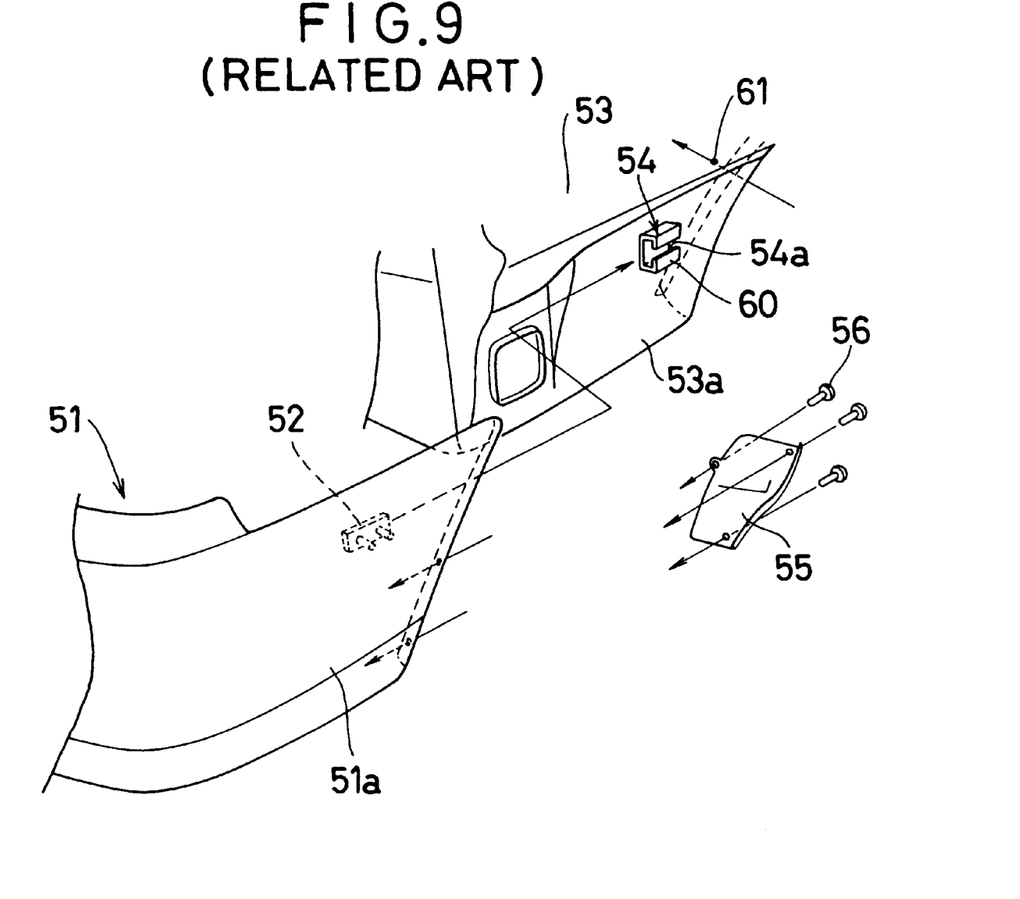
FIG. 9 is a perspective view showing a state before the bumper side of the conventional rear bumper is fastened to a side body.
Figure 10:
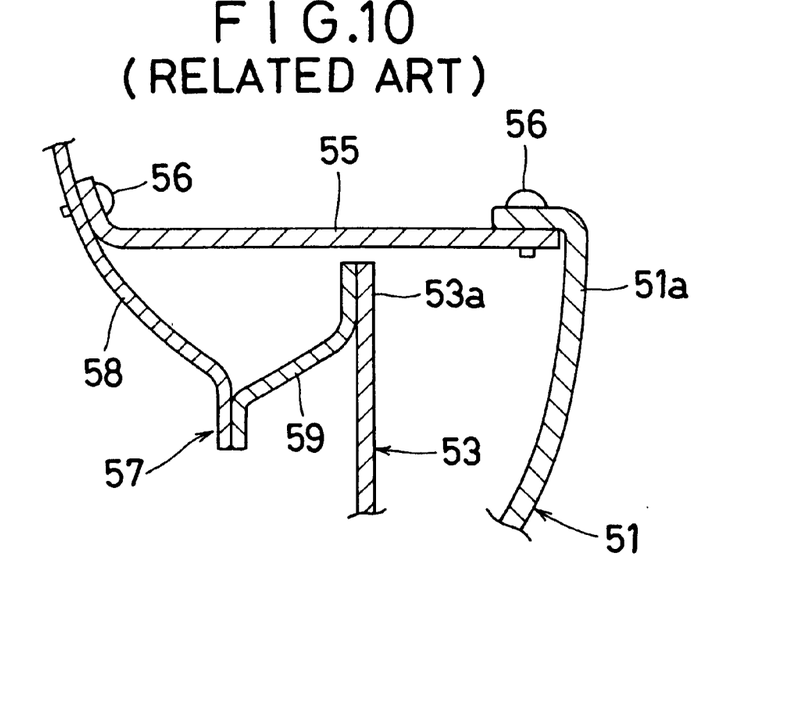
FIG. 10 is a sectional view taken along the line E—E of FIG. 8.
Figure 11:
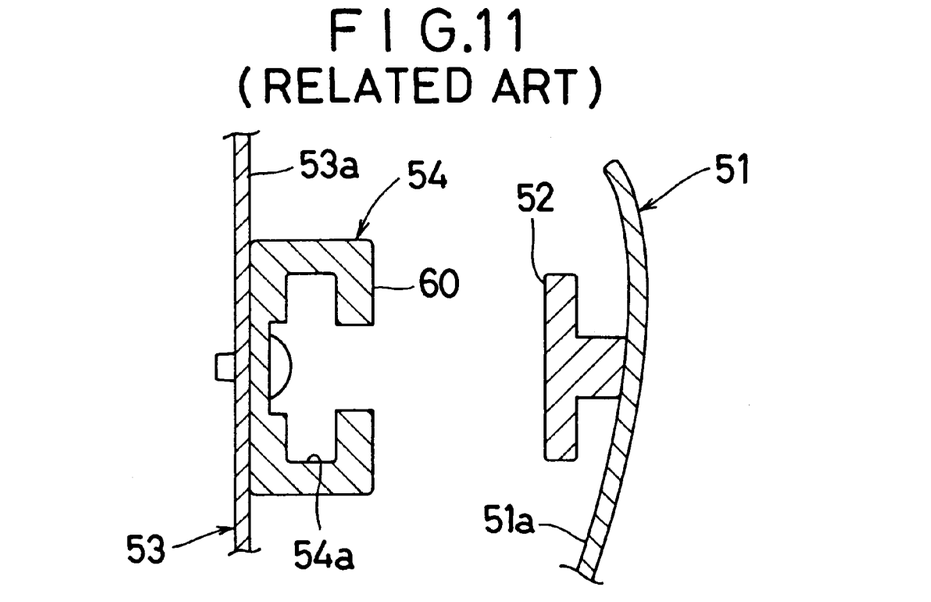
FIG. 11 is a sectional view taken along the line D—D of FIG. 8.

A typical bumper side supporting structure for a conventional rear bumper provided on a motor vehicle is shown in FIGS. 8 to 12. In such a supporting structure, a slider 52 is installed on the back surface of a bumper side 51a of a rear bumper 51, and a holder 54 is installed on the outside surface of an outer panel 53a of a side body 53. The slider 52 is inserted into a slot 54a of the holder 54 in the arrow-marked direction in FIG. 9, and the bumper side 51a is fixed by fastening a lining 58 to an inner panel 58 and the bumper side 51a with screws 56 or the like. In FIG. 10, reference numeral 59 denotes an outer panel composing a rear wheel house 57.

Figure 12:
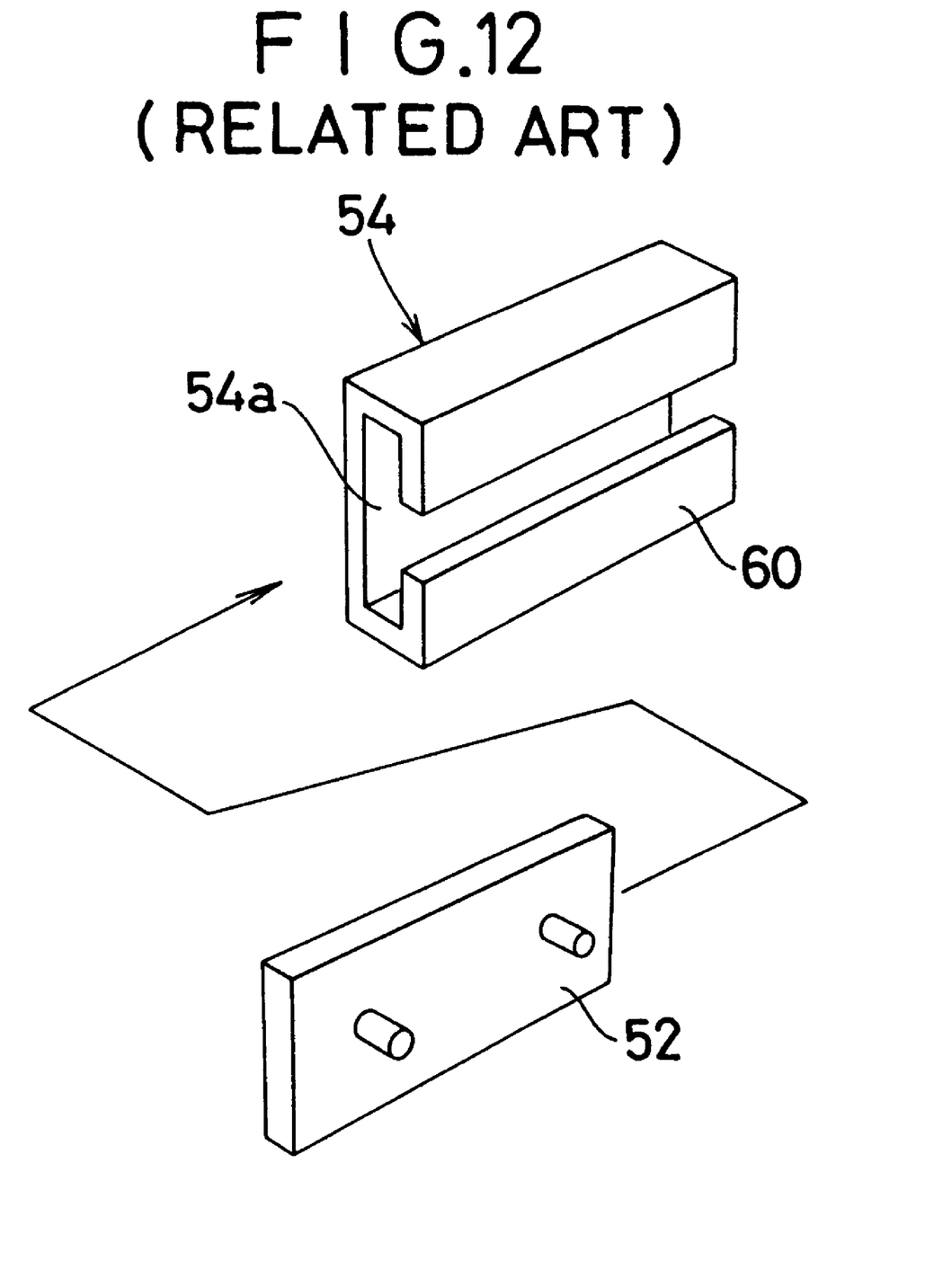
FIG. 12 is a perspective view showing a relationship between a slider and a holder used in the conventional supporting structure.

In the above-described conventional supporting structure, the slider 52 and the slot 54a of the holder 54 have rectangular cross-sectional shapes corresponding to each other, a locking member 60 is provided on the holder 54 to prevent the slider from coming off, and the upper-side opening of the slot 54a is formed into a narrow shape. Therefore, when the rear bumper 51 is installed to the side body 53, the slider 52 is inserted into the slot 54a of the holder 54 from the rear side of the body while aligning the slider 52 with the slot 54a as shown in FIGS. 9 and 12. This work is difficult to do, so that the workability is inferior.

Also, in the conventional supporting structure, a gap is produced between the bumper side 51a of the rear bumper 51 and the outer panel 53a of the side body 53 as shown in FIG. 10. To fill this gap, the lining 55 must be used. Moreover, to fasten this lining 55, mounting holes 61 must be drilled in the inner panel 58 of the rear wheel house 57 to accommodate the screws 56, which provides communication between the interior of the cabin and the outside, resulting in water leakage.

OBJECT AND SUMMARY OF THE INVENTION

The present invention was made to solve the above problems. Accordingly, an object of the present invention is to provide a bumper side supporting structure which eliminates the need for a lining for filling a gap between a bumper side and a side body, prevents water leakage, reduces the part cost, and enhances the stiffness of a portion for fastening a bumper.

Another object of the present invention is to provide a bumper side supporting structure which improves the workability by reviewing the shapes of the bumper side holder and the slider used in the conventional supporting structure.

To solve the above problems with the conventional technique, according to the present invention, an outer panel of a wheel house is extended toward the outside of a body beyond an outer panel of a side body, and a bumper side is fastened to the extended portion via a bracket.

In the bumper side supporting structure in accordance with the present invention, since the outer panel of the wheel house is extended toward the outside of the body beyond the outer panel of the side body, and the bumper side is fastened to the extended portion via the bracket, no gap is produced between the bumper side and the outer panel of the side body, unlike the conventional supporting structure. Therefore, the lining for filling this gap is not needed, and the stiffness of the portion for fastening the bumper can be enhanced. Moreover, there is no need for drilling a mounting hole in the bracket at a place where communication between the interior of the cabin and the outside is provided.

As described above, in the bumper side supporting structure in accordance with the present invention, since the outer panel of the wheel house is extended toward the outside of the body beyond the outer panel of the side body, and the bumper side is fastened to the extended portion via the bracket, there is no need for filling the gap between the bumper side and the outer panel of the side body by using the lining, unlike the conventional supporting structure, so that the part cost can be reduced, and the stiffness of the portion for fastening the bumper can be enhanced by the presence of the extended portion. Also, in the supporting structure of the present invention, the portion for fastening the bracket is provided on the extended portion of outer panel, not on the inner panel of wheel house. Therefore, a mounting hole in the bracket is not drilled at a place where communication between the interior of the cabin and the outside, so that effective measures against water leakage can be taken.

DETAILED DESCRIPTION OF PREFERRED EMBODIMENTS

The present invention will be described below with reference to one embodiment shown in the drawings.

FIGS. 1 to 7 show one embodiment of a bumper side supporting structure in accordance with the present invention. In these figures, reference numeral 1 denotes a resin rear bumper installed at the rear end of a body 2 composing a four-wheel motor vehicle. This rear bumper 1 absorbs shock energy from the rear, by which damage to the body 2 is prevented.

The rear bumper 1 has a bumper side 3 bent around the rear side corner of the body 2 at each end. The bumper side 3 extends toward the front of the body 2. As shown in FIGS. 1 to 4, an attaching member 3a, which is formed by bending the front end of the bumper side 3 to the inside (side of body 2), is provided at the front end of the bumper side 3. At the lower part of the attaching member 3a, a pair of upper and lower mounting holes 5 and 6 are drilled to accommodate screws (or clips etc.) 4. Further, a slider 7, which engages with a holder, described later, to hold the bumper side 3, is integrally mounted on the back surface at the intermediate position of the upper part of the bumper side 3.

Figure 1:
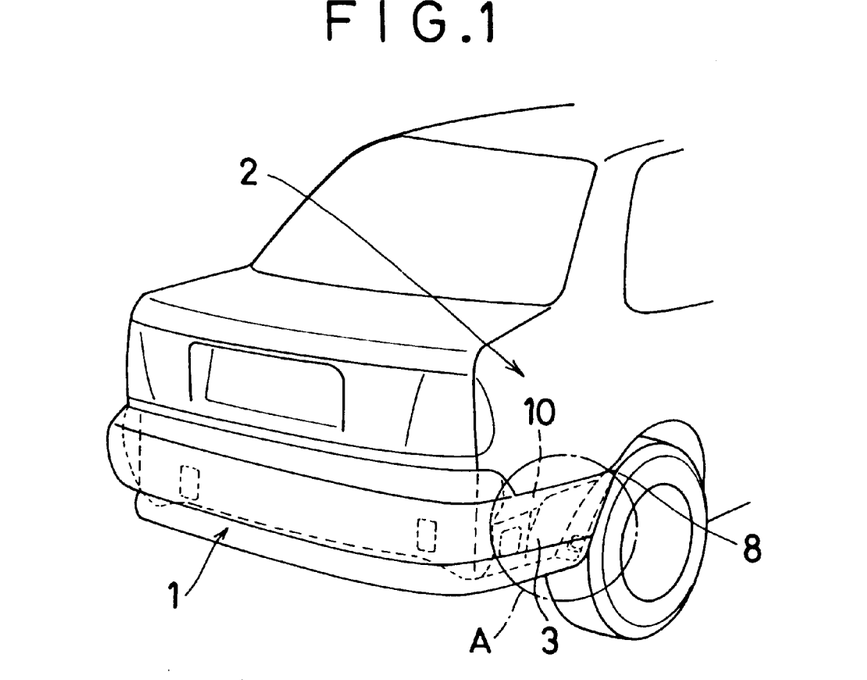
FIG. 1 is a perspective view of a rear part of a motor vehicle on which a rear bumper is mounted, which bumper has a supporting structure in accordance with one embodiment of the present invention.
Figure 2:
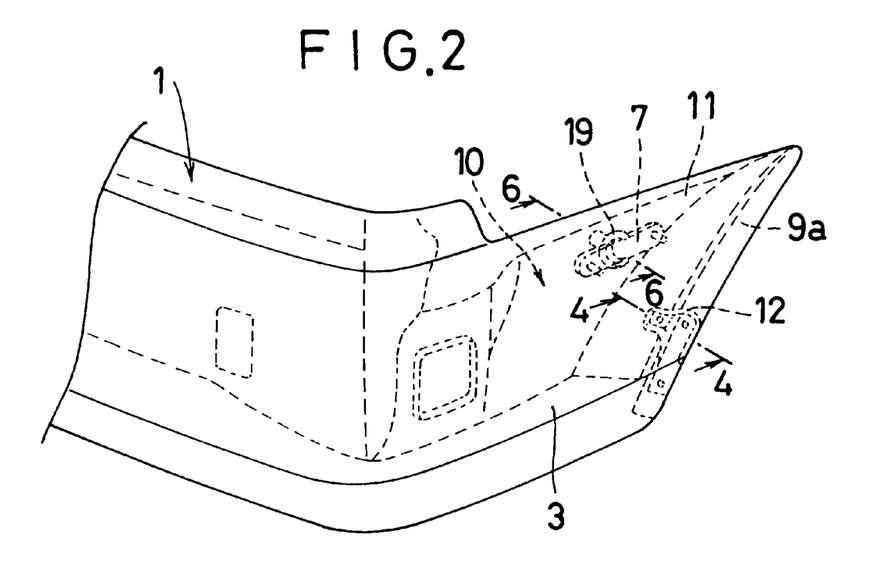
FIG. 2 is an enlarged perspective view of part A of FIG. 1.
Figure 3:
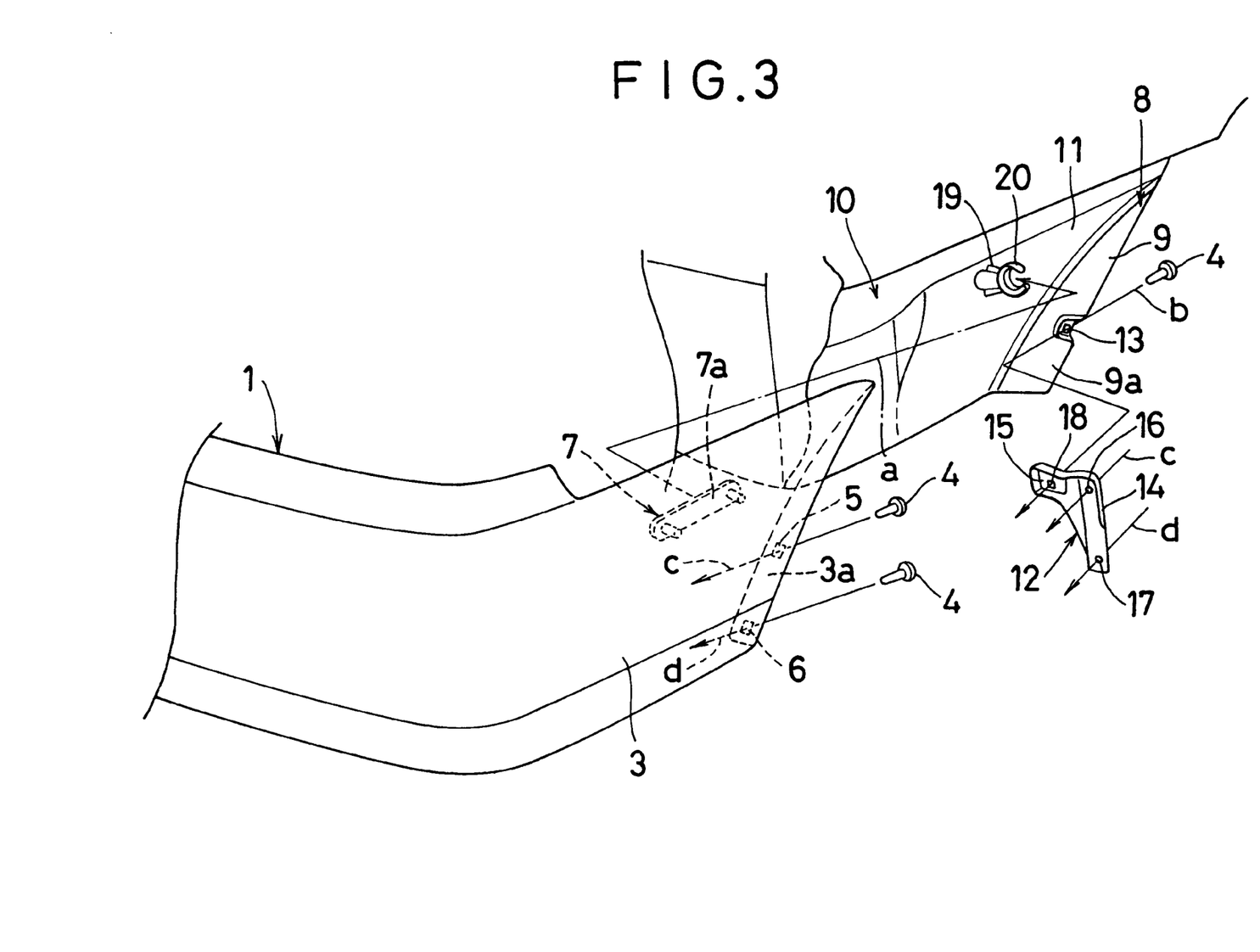
FIG. 3 is a perspective view showing a state before a bumper side of the rear bumper is fastened to a side body.
Figure 4:
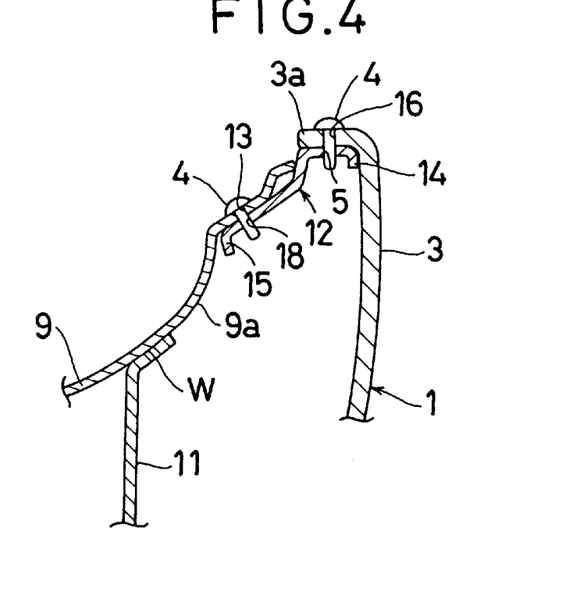
FIG. 4 is a sectional view taken along the line C—C of FIG. 2.

At the rear end of the body 2, as shown in FIGS. 2 to 4, an outer panel 9 of a rear wheel house 8 and an outer panel 11 of a side body 10 are disposed, and these two outer panels 9 and 10 are joined together. The outer panel 9 of the rear wheel house 8 extends toward the outside of body (right side in FIG. 4) beyond the outer panel 11 of the side body 10. Therefore, an extension 9a is formed, which extension further extends from a joint portion W, where the outer panel 9 of the rear wheel house 8 is joined to the outer panel 11 of the side body 10. To this extension 9a, the bumper side 3 is fixed via a supporting bracket 12. Accordingly, an insertion hole 13 is made in the extension 9a to accommodate a screw 4.

Figure 5:
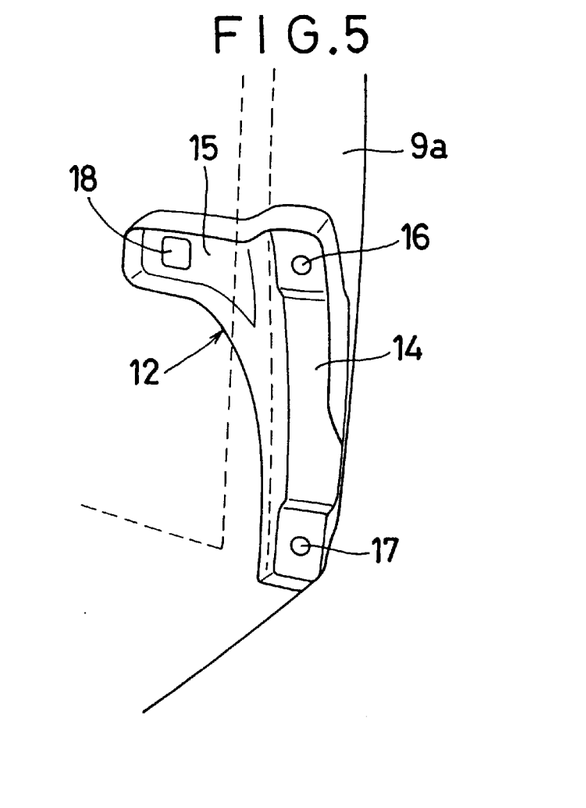
FIG. 5 is a perspective view of a bracket for fastening the bumper side of the rear bumper to the side body.

The supporting bracket 12 consists of a bracket body 14 extending vertically and a supporting member 15 extending from the upper end portion of the bracket body 14 in the width direction, as shown in FIGS. 3 to 5. The supporting bracket 12 is disposed in such a manner that the bracket body 14 and the supporting member 15 takes an inverse L shape. The bracket body 14 constitutes a portion for fastening the bumper side 3, and therefore two through holes 16 and 17 are drilled at the upper and lower part thereof to accommodate screws 4. The supporting member 15 constitutes a portion for fastening the extension 9a of the outer panel 9 of the rear wheel house 8, so that the supporting member 15 is bent into a shape such as to lap over the extension 9a of the rear wheel house 8, and has one screw hole 18 drilled in the intermediate portion thereof to accommodate a screw 4.

Figure 6:
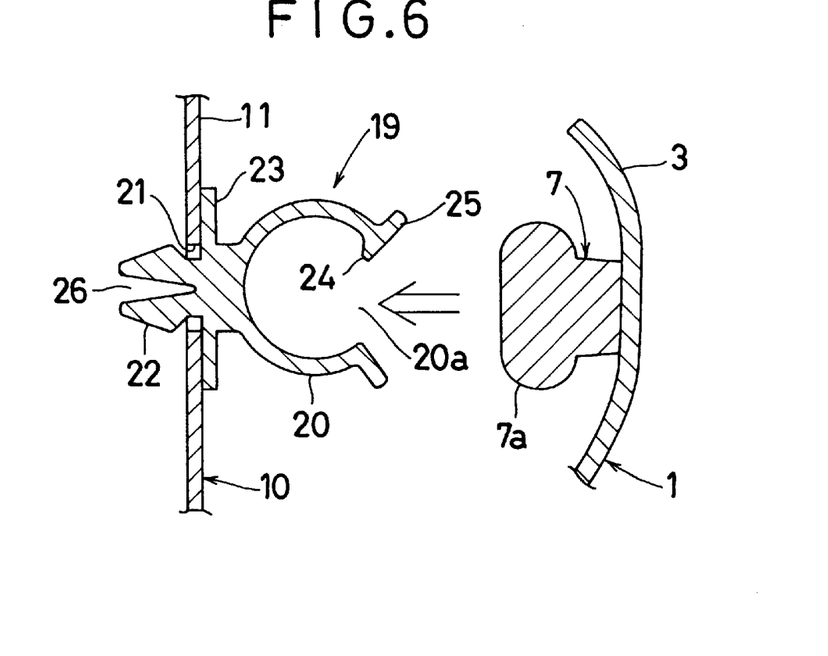
FIG. 6 is a sectional view taken along the line B—B of FIG. 2.

An engaging portion 7a of the slider 7 is disposed so as to protrude from the back surface of the bumper side 3, and provided along the longitudinal direction of the bumper side 3 as shown in FIG. 6. The engaging portion 7a of the slider 7 has a cross-sectional shape of an elongated circle or an ellipse so as to fit smoothly in a holder 19 of the side body 10.

The holder 19 consists of a holder body 20 which is disposed outside of the outer panel 11 of the side body 10 to receive the engaging portion 7a of the slider 7, an engaging member 22 which is fitted into a mounting hole 21 in the outer panel 11, and a flange 23 disposed between the holder body 20 and the engaging member 22. The holder body 20 has a cross-sectional shape of a letter of C, so that the engaging portion 7a of the slider 7 can fit in the holder body 20. The opening portion 20a of the holder body 20 has a locking claw 24 protruding from the inner peripheral wall surface of the holder body 20. The locking claw 24 catches the engaging portion 7a of the slider 7, which prevents the rear bumper 1 from coming off during the driving of motor vehicle. Further, the opening portion 20a of the holder body 20 has a guide member 25 extending outward obliquely, so that the engaging portion 7a of the slider 7 can fit easily in the holder body 20 by means of the guide member 25.

Figure 7:
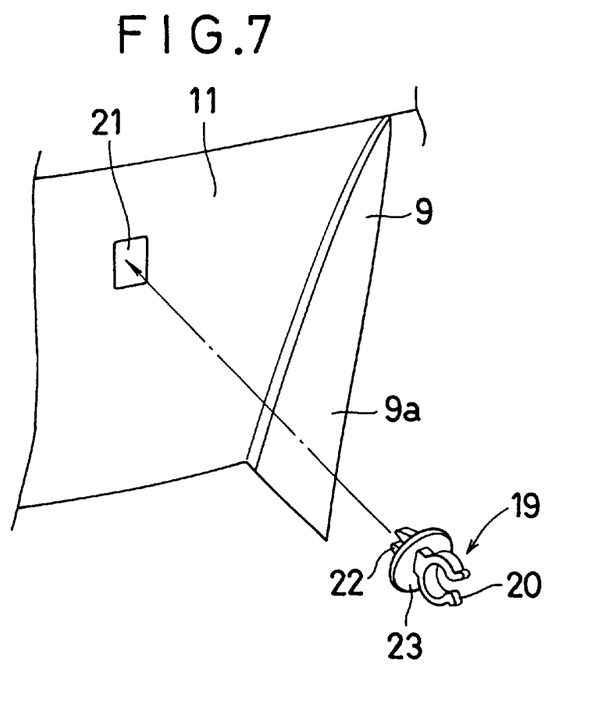
FIG. 7 is a perspective view showing a state in which a holder used in the supporting structure of this embodiment is installed to an outer panel of the side body.
Figure 8:
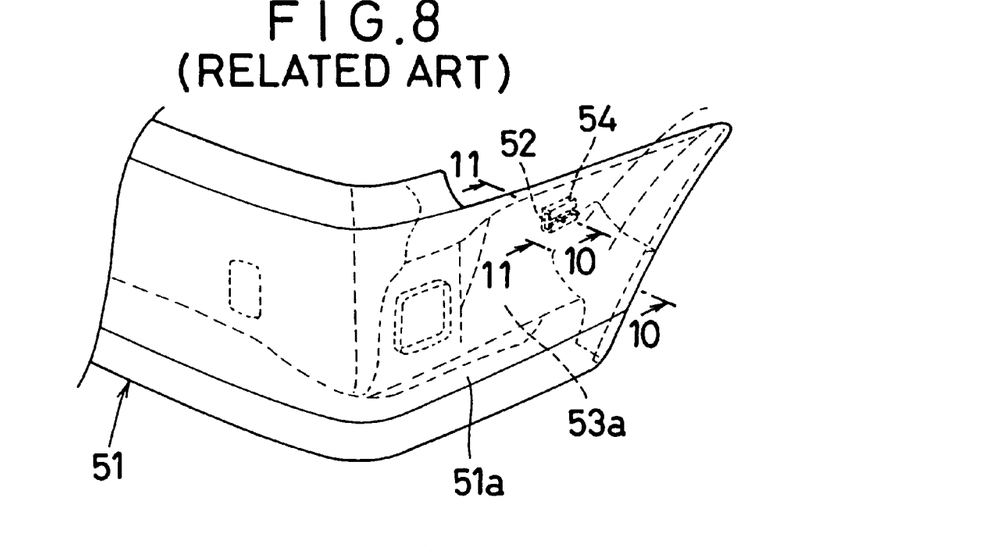
FIG. 8 is a perspective view of a bumper side of rear bumper fastened by using a conventional supporting structure.

The engaging member 22 is formed into a shape of the feathers of an arrow in cross section, and provided at the central portion thereof with a slit 26 spreading toward the tip end. The engaging member 22 is elastically deformed inward by the slit 26 when being fitted into the mounting hole 21. After being fitted into the mounting hole 21, the engaging member 22 returns to the original shape to engage with the opening edge of the mounting hole 21 as shown in FIG. 6. For this reason, the mounting hole 21 is formed into a rectangular shape as shown in FIG. 7 so that the engaging member 22 of the holder 19 can fit in the mounting hole 21. The flange 23 is formed into a disk shape with a diameter larger than the outside size of the mounting hole 21, so that the outer panel 11 of the side body 10 is held between the engaging member 22 and the flange 23.

The bumper side 3 of the rear bumper 1 of this embodiment is installed to the rear end of the body 2 by the procedure described below. First, the engaging portion 7a of the slider 7 is fitted into the holder body 20 of the holder 19 as indicated by arrow a in FIG. 3 with the back surface of the bumper side 3 facing the outer panel 11 of the side body 10. Then, the screw 4 is inserted into the insertion hole 13 and the screw hole 18 in the direction of arrow b to fasten the supporting bracket 12 to the extension 9a of the outer panel 9 of the rear wheel housing 8. Further, the screws 4 are inserted into the through holes 16 and 17 and the mounting holes 5 and 6 in the direction of arrows c and d, respectively, by which the bumper side 3 of the rear bumper 1 is firmly fixed to the extension 9a of the outer panel 9 of the rear wheel house 8 via the supporting bracket 12 while being held to the outer panel 11 of the side body 10 by the slider 7 and the holder 19 (refer to FIGS. 2 and 4).

In the supporting structure of this embodiment, the engaging portion 7a of the slider 7 installed on the bumper side 3 of the rear bumper 1 has a cross-sectional shape of an elongated circle or an ellipse, while the holder body 20 of the holder 19 installed on the side body 10 has a cross-sectional shape of a letter of C, and these elements are configured so as to fit together. Therefore, the bumper side 3 can be held to the outer panel 11 of the side body 10 by fitting the engaging portion 7a of the slider 7 into the holder body 20 of the holder 19, so that the workability can be improved. The supporting bracket 12 consists of the bracket body 14 and the supporting member 15, and the bracket body 14 extends vertically. By extending the lower part of the bracket body 14, the supporting bracket 12 is fastened to the bumper side 3 at two places. Therefore, the stiffness of the fastened bumper side 3 can be enhanced. Moreover, the holder 19 can be easily installed by fitting the engaging member 22 thereof into the mounting hole 21. Therefore, the workability can further be increased.

One embodiment of the present invention has been described above. However, the present invention is not limited to the above-described embodiment, but can be modified and changed variously in light of the above teachings.

We claim:

1. A bumper side supporting structure on a side body of an automobile having a wheel house and including an outer panel of said wheel house, said automobile having a front end, a rear end, and two sides connecting said front and rear ends, and, said structure comprising:

an extended portion of said outer panel extending obliquely outwardly with respect to said automobile and forwardly with respect to said automobile, towards the outside of said side body beyond the rest of said outer panel;

said outer panel and said side body being joined together along a joint, such that said extended portion extends outwardly from said joint beyond said side body;

a bumper having a side with a front end, said front end including a fixing piece which is bent inwardly toward said side body; and a bracket being fastened to said extended portion and said fixing piece, wherein said bracket comprises a bracket body, which constitutes a portion for fastening said bumper side and extends vertically, and a supporting member, which constitutes a portion for fastening said extended portion of said outer panel of said wheel house, and said supporting member extends from the upper end portion of said bracket body in a direction from one side of said automobile to the other side of said automobile.

2. A bumper side supporting structure according to claim 1, wherein a slider installed on said bumper side and a holder installed on said outer panel of said side body have respective cross-sectional shapes such as to fit together, and said bumper side is held to said side body by fitting said slider into said holder.

* * * * *